United States Patent [19]

Yamaguchi et al.

[11] 4,072,639

[45] Feb. 7, 1978

[54] UNDERCOATING COMPOSITION FOR POLYESTERS CONTAINING EPOXY COMPOUNDS

[75] Inventors: Teruo Yamaguchi; Hidefumi Sera, both of Minami-ashigara, Japan

[73] Assignee: Fuji Photo Film Co., Ltd., Minami-ashigara, Japan

[21] Appl. No.: 664,224

[22] Filed: Mar. 5, 1976

[30] Foreign Application Priority Data

Mar. 7, 1975 Japan ................................. 50-27785

[51] Int. Cl.[2] ............................................ C08L 89/00

[52] U.S. Cl. ....................................... 260/6; 96/87 R; 260/8; 260/13; 260/17 R; 260/17.4 ST; 260/29.2 EP; 428/413

[58] Field of Search ............................ 260/29.2 EP, 6; 428/413; 96/87

[56] References Cited

U.S. PATENT DOCUMENTS

| | | | |
|---|---|---|---|
| 3,178,378 | 4/1965 | Winchell | 260/6 |
| 3,741,934 | 6/1973 | Heslinga et al. | 260/2 EC |
| 3,922,422 | 11/1975 | Wise | 260/29.2 EP |
| 3,977,878 | 8/1976 | Roteman | 96/87 R |

*Primary Examiner*—Edward M. Woodberry
*Attorney, Agent, or Firm*—Sughrue, Rothwell, Mion, Zinn and Macpeak

[57] ABSTRACT

An undercoating composition for polyesters which contains a compound having two or more epoxy groups in its molecule and a molecular weight of about 1,000 or less.

6 Claims, No Drawings

UNDERCOATING COMPOSITION FOR POLYESTERS CONTAINING EPOXY COMPOUNDS

BACKGROUND OF THE INVENTION

1. Field of the Invention

This invention relates to an undercoating composition for polyesters, and, more particularly, it is concerned with an undercoating composition for polyesters for photographic use, which undercoating contains a compound having two or more epoxy groups in its molecule and which is capable of giving strong adhesion to photographic emulsion layers, as well as a photographic material comprising the same.

2. Description of the Prior Art

Polyester films are more excellent in mechanical properties, dimensional stability, heat resistance, chemical resistance and transparency than other plastic supports, and, therefore, their use, for example, in photographic materials, printing materials, drawing materials, magnetic materials, etc., has lately increased. In particular, polyester films have lately come into great demand as supports for photographic films.

As is well known in the art, various undercoating methods are used to obtain strong adhesion between a polyester film and a photographic emulsion layer. However, polyesters are generally too hydrophobic to show good adhesiveness to a hydrophilic photographic emulsion layer, due to their high crystallinity, chemical inactivity, their high chemical resistance (proper solvents for polyesters are difficult to find) and their having no hydrophilic groups.

To the present, many efforts have been made to solve this problem, for example: (1) subjecting a polyester to a surface treatment such as chemical treatment, mechanical treatment, discharge treatment, flame treatment, ultraviolet ray treatment, high frequency treatment, glow discharge treatment, plasma treatment, razor treatment, mixed acid treatment or ozone oxidation treatment and then coating the same with a photographic emulsion; and (2) subjecting a polyester to a surface treatment as described above, coating the same with an undercoating layer and then with a photographic emulsion, as disclosed in U.S. Pat. Nos. 2,698,241; 2,764,520; 2,934,937; 3,072,483; 3,143,421; 3,145,105; 3,145,242; 3,360,448; 3,376,208; 3,475,193; and 3,582,339; in British patent specification Nos. 778,365 and 804,005; in Belgian Pat. No. 663,578 and in Japanese Patent Publication No. 24,270/1972.

As a surface treatment-free undercoating method, there is the so-called multi-layer method which comprises providing, as a first layer, a layer containing a resin that is adhesive to polyesters and has low chemical resistance and coating thereon a hydrophilic resin layer as a second layer, as well as the so-called mono-layer method comprising coating only one layer of resin which comprises both a hydrophobic group and a hydrophilic group. However, the latter method has the disadvantages that insufficient adhesive strength is obtained.

Organic solvents have often been used to improve adhesiveness, but are not preferred, because of the difficulty of handling the same, high production costs and, in general, their toxicity. Even in the case of using organic solvents, sufficient adhesiveness between a polyester and a photographic emulsion layer is not easily obtained.

It has further been proposed to add a polyester swelling agent to an undercoating composition so as to activate the polyester, but, according to this method, a large amount of polyester swelling agent must be used in order to obtain sufficient adhesive force. Since such a swelling agent is generally a high boiling point compound and the use thereof in large amounts requires high temperatures and long drying times, swelling of the polyester occurs along with a lowering of elasticity at the initial stages and shrinkage at the later stages of drying, resulting in a lowering of surface quality of the support and wrinkling.

On the other hand, in one method an aqueous undercoating composition is used which is free of organic solvents, i.e., an emulsified copolymer or a water soluble compound is used. For example, one method comprises using an undercoating composition containing an emulsified hydroxymethylated N-(1,1-dimethyl-3-oxobutyl)acrylamide copolymer as disclosed in Japanese Patent Application No. 37,652/1974, an undercoating composition containing an emulsified copolymer of methyl acrylate, vinylidene chloride and itaconic acid as disclosed in U.S. Pat. No. 2,852,378, an undercoating composition containing a polyamide-epichlorohydrin resin as disclosed in Japanese Patent Application No. 74,006/1974 and an undercoating composition containing a polyvalent metal salt such as a stannous salt, stannic salt, ferric salt, chromic salt or zirconium salt, as disclosed in U.S. Pat. No. 3,535,147.

In the case of using an emulsified copolymer, however, various problems are encountered due to the fact that a hydrophobic polymer is dispersed using a dispersion agent, for example, gels tend to occur, filtration must be carried out in several stages, the stability or storage capability of the coating composition is insufficient and various additives used for the dispersion have a harmful influence on photographic emulsion layers applied to the undercoating layer.

SUMMARY OF THE INVENTION

Therefore, it is a first object of this invention to provide a coating composition for forming an undercoating layer (often merely referred to as an undercoating composition) whereby the use of an organic solvent can be omitted.

It is a second object of this invention to provide an undercoating composition with improved stability and of low cost.

It is a third object of this invention to provide an undercoating layer having good adhesive strength.

It is a fourth object of this invention to provide an undercoating composition having an adhesive strength sufficient not to change during the passage of time at $-30°$ C to $+90°$ C.

It is a fifth object of this invention to provide an undercoating composition which does not irritate the skin.

It is a sixth object of this invention to provide an undercoating composition which is easy to handle.

It is a seventh object of this invention to provide an undercoating composition which does not cause environmental pollution.

It is an eighth object of this invention to provide an undercoating composition which provides a photographic support with excellent surface properties.

It is a ninth object of this invention to provide an undercoating composition capable of being coated at a high speed.

These objects are reached by an undercoating composition for polyesters which contains a compound having two or more epoxy groups, preferably two to six epoxy groups, in its molecule and which has a molecular weight of about 1,000 or less, preferably about 130 to about 1,000.

DETAILED DESCRIPTION OF THE INVENTION

Of compounds having two or more epoxy groups in their molecule, copolymers comprising a vinyl monomer having an epoxy side chain as described in Japanese Patent Publication No. 9,629/1959 or epoxidated polybutadienes as described in Japanese Patent Publication No. 10,837/1970 are known as an undercoating for polyester supports; such are, however, clearly distinguishable from the compounds used in the present invention.

Moreover, methods comprising using epoxy compounds for the purpose of hardening gelatin are described in Japanese Patent Publication No. 7,133/1959 and many other patents, but the present invention is also different from these known methods. That is to say, the details of the adhesion mechanism according to the present invention are not clear, but the epoxy compound of this invention does not act as a gelatin hardener but, rather, strongly adheres to the surface of a polyester support and serves to render it hydrophilic.

Of compounds having two or more epoxy groups in their molecule, those having a molecular weight of 1,000 or more are expensive and hard to be prepared as a single compound and those having more than six epoxy groups in their molecule are hard to prepare as a single compound and to store without reaction of their molecules with each other. Therefore, these compounds are not preferred.

The polyester support used in the present invention comprises a linear polyester which is obtained by condensing a dibasic aromatic acid and a glycol. Typical examples of the dibasic acid are terephthalic acid, isophthalic acid, p-β-oxyethoxybenzoic acid, diphenyl sulfone dicarboxylic acid, diphenoxyethanedicarboxylic acid, adipic acid, sebacic acid, azelaic acid, 5-sodium sulfoiosphthalic acid, diphenylenedicarboxylic acid and 2,6-naphthalenedicarboxylic acid and typical examples of the glycol are ethylene glycol, propylene glycol, butanediol, neopentylene glycol, 1,4-cyclohexanediol, 1,4-cyclohexanedimethanol, 1,4-bishydroxyethoxybenzene, diethylene glycol and polyethylene glycol.

Of polyesters comprising these components, the most easily obtainable polyester is polyethylene terephthalate. Therefore, this invention will now be illustrated in detail for the case of polyethylene terephthalate.

The polyester support of the present invention can comprise one surface of polyester, and, therefore, it may comprise a different support carrying a polyester layer. For example, various transparent, semi-transparent or opaque supports such as cellulose triacetate films, polystyrene films, polycarbonate films, polypropylene films, films laminated with such polymer films, glass sheets, baryta papers, resin-processed papers such as polyethylene coated papers, synthetic papers and metal sheets can be used if laminated with polyester films.

The thickness of the polyester film or layer used is not particularly limited, but ordinarily it will be about 12 to about 500 microns, preferably 40 to 200 microns in view of the ease of handling and the range of intended use. Particularly, biaxially stretched crystalline polyesters (see, *Plastics*, 26, 6 (1953) published by Heywood-Temple Industrial Publications, Ltd. (London)) are desirable for their stability or strength.

While only photographic materials are disclosed in this specification, the technique of the present invention is, of course, useful in general in fields wherein adhesion between polymeric articles having at least one polyester surface and a hydrophilic resin layer is required.

The surface of a polyester film can be subjected to coating of the undercoating composition according to the invention as it is, but, if necessary or desired, it may be subjected to various surface activation treatments to render it hydrophilic before coating. Examples of such surface activation treatment comprise an oxidizer solution treatment as described in U.S. Pat. No. 2,943,937, an ultraviolet ray irradiation treatment as described in U.S. Pat. No. 3,475,193, an electric discharge treatment such as a corona discharge treatment as described in U.S. Pat. No. 3,615,557, an active gas application treatment as described in British patent specification No. 1,215,234 and a flame treatment as described in U.S. Pat. No. 3,590,107.

As the compound having two or more epoxy groups in its molecule and a molecular weight of about 1,000 or less, there can be used those obtained from olefins through ozone oxidation or peroxidation or glycidyl compounds obtained by the reaction of alcohols and epihalohydrins or methylepihalohydrins. Of these epoxy compounds, compounds represented by general formula (I) and their salts are preferably used in the present invention:

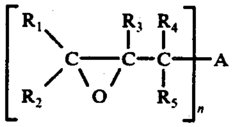

(I)

in which $R_1$ to $R_5$, which may be the same or different, represent a hydrogen atom or an alkyl group having 1 to 3 carbon atoms, $n$ represents an integer of 2 to 6 and A represents a linear or cyclic group having $n$ nitrogen atoms or $n$ oxygen atoms (where the nitrogen atoms or oxygen atoms are directly bonded to the glycidyl group), for example, a polyamine, preferably having two to six amino groups, such as ethylenediamine and p-phenylenediamine, a polyhydric alcohol, preferably having two to six hydroxy groups, such as ethylene glycol, tetraethylene, glycol, glycerine, sorbitol and hydroquinone, 5- or 6-membered heterocyclic rings having two or more active nitrogen atoms in the ring such as imidazolidine, pyrazolidine, triazolidine, piperazine, and triazine, which heterocyclic rings may have bonded thereto up to three heteroatoms such as S, N and O at the nitrogen atom(s) thereof or at the carbon atom(s) of the heterocyclic rings, a nitrogen atom, a phosphate group or a sulfate group.

Examples of the epoxy compound used in the invention are given below without intending to limit the invention.

i. Cases wherein the glycidyl group is bonded to a nitrogen atom of A

Compound 1 N,N',N''-tris(2,3-epoxypropyl)isocyanurate

Compound 2 N,N'-di(2,3-epoxypropyl)-5,5-dimethylhydantoin

Compound 3 N,N'-di(2,3-epoxypropyl)imidazolidine-2-one

Compound 4 N,N'-di(2,3-epoxypropyl)diketopiperazine

Compound 5 N,N',N''-tris(2,3-epoxypropyl)amine

Compound 6 N,N',N''-tris(2,3-epoxypropyl)-N-methylammonium p-toluenesulfonate

Compound 7 N,N'-bis(2,3-epoxypropyl)-N,N'-dimethylpiperazinium p-toluenesulfonate Compound 8 1-(2,3-epoxypropyl)-3-(2,3-epoxy-2-methylpropyl)-5,5-dimethylhydantoin ii. Cases wherein the glycidyl group is bonded to an oxygen atom of A Compound 9 ethylene glycol-diglycidyl ether Compound 10 tetraethylene glycol-diglycidyl ether Compound 11 glycerin-triglycidyl ether Compound 12 sorbitol-tetraglycidyl ether Compound 13 tri(2,3-epoxypropyl)phosphate Compound 14 2,4,6-triglycidyloxy-1,3,5-triazine These compounds are commercially available or can easily be synthesized. The compounds in which A comprises an N atom bonded to the glycidyl group are more preferred, and, particularly, N,N',N''-tris(2,3-epoxypropyl)isocyanurate is preferred in view of the reactivity, ease of synthesis and ready obtainability thereof.

Methods of synthesizing the above compounds are described in, for example, G. A. Buehler, D. E. Pearson, *Survey of Organic Syntheses,* Wiley-Interscience, p. 285 (1970), Nippon Kagakukai, *Jikken Kagaku Koza* 17, Reaction of Organic Compounds I (First Volume), published by Maruzen Co., p. 282 (1957), S. R. Sandler and W. Karo, *Organic Functional Group Preparation,* Academic Press, p. 100 (1968), H. Lee and K. Neville, *Epoxy Resins,* McGraw-Hill, p. 3 (1957), *Epoxy Jushi no Seizo to Oyo* (*Production and Application of Epoxy Resins*), Kobunshi Kagaku Kankokai, p. 101 (1963) and M. Bundnowski, *Kunststoffe,* 55, 641 (1965).

The undercoating composition of the present invention is an undercoating composition comprising one or more of the above described epoxy compounds in water as a primary solvent or as the sole solvent (hereafter, merely the solvent). Of course, a water miscible polar organic solvent can, if necessary, be used as an auxiliary solvent while keeping the adhesive effect as it is. Suitable water miscible polar organic solvents are those having a boiling point of less than about 200° C, such as alcohols (e.g., methanol, ethanol, propanol, isopropanol, etc.), ketones (e.g., acetone, methyl ethyl ketone, methyl isobutyl ketone, etc.), ethers (e.g., methyl ethyl cellosolve, ethyl cellosolve, butyl cellosolve, etc.) and esters (e.g., acetic cellosolve, ethyl acetate, etc.) and the like. The lower the amount of water miscible polar organic solvent, the better it is from the safety or economic point of view, however.

The undercoating composition containing water as a solvent preferably contains 50% by weight or more of water and 50% by weight or less of water miscible polar organic solvent, and most preferably water is the sole solvent. The quantity of the epoxy compound added to the undercoating composition is not particularly limited and is suitably determined depending on the solubility thereof or the quantity of the undercoating composition to be coated. The quantity of the epoxy compound of the invention to be coated onto a polyester surface is preferably about 0.1 to about 500 mg, particularly preferably 1 to 200 mg, per $m^2$. If less than about 0.1 mg is used, it is difficult to obtain a sufficient adhesive strength, while if more than about 500 mg is used, while adhesion is increased it is difficult to provide a uniform layer on a polyester support and coating unevenness is caused.

As will be apparent from the above discussion, the essential components of the undercoating composition of the present invention are a coating solvent, such as water and, if desired, optionally a water miscible polar organic solvent (the amount of the organic solvent is generally 0 to 50% by weight of the total weight of the solvent, balance water) plus, of course, one or more epoxy compounds of this invention.

The undercoating composition of the present invention optionally contains surfactants, hydrophilic organic colloid and swelling agents for polyesters.

When a surfactant such as saponin, polyethylene glycol ether, acylated taurine, maleoyl pimarate, a long chain sulfonic acid or a salt thereof, a glycerine ester or a sorbitan ester is added to an undercoating composition in an amount of about 0.01 to about 0.2% by weight, coating properties are improved. Examples of suitable surfactants are those described in U.S. Pat. Nos. 2,739,891; 2,823,123 and 2,831,766 and in Japanese Patent Publication Nos. 10,247/68, 8,401/69 and 21,983/71.

Examples of the hydrophilic organic colloid or colloids which can be used in the undercoating composition of the invention are cellulose derivatives such as carboxymethyl cellulose and hydroxyethyl cellulose, gelatin, colloidal albumin, casein, agar-agar, sodium alginate, sugar derivatives such as starch derivatives, and synthetic hydrophilic colloids such as polyvinyl alcohol, poly-N-vinylpyrrolidone, polyacrylate copolymer, polyacrylamide or derivatives or partial hydrolyzates thereof. If desired, these colloids can be used in combination.

The most commonly used colloid is gelatin, a part or all of which can be substituted for by synthetic high molecular weight materials, e.g., a so-called gelatin derivative where a functional group of gelatin, i.e., an amino group, imino group, hydroxyl group or carboxy group which has been treated or modified with a reagent having a group reactive with these functional groups or where gelatin is combined with a graft polymer, i.e., where a molecular chain of another high molecular weight material is bonded to gelatin such as phthalated gelatin, benzene sulfonated gelatin, etc., can be used.

When used, the quantity of a hydrophilic organic colloid such as gelatin added to the undercoating liquor of the invention is about 0.01 to about 2.5% by weight based on the total weight of the undercoating composition. Additional examples of hydrophilic organic colloids which can be used in this invention are described in U.S. Pat. Nos. 3,062,674; 3,142,568; 3,193,386; 3,220,844; 3,411,911; 3,411,912; 3,287,289 and 3,488,708.

As swelling agents for polyesters, for example, there can be used compounds comprising one or more aromatic rings such as a benzene ring, naphthalene ring, pyridine ring, pyrrole ring or condensed ring systems therewith, or those substituted by one or more alkyl, alkoxy, acyl, nitro, cyano, halogen atoms, hydroxy, formyl, carboxy, alkoxycarbonyl, hydroxyalkyl, aminoalkyl or haloalkyl group, and alcohols, ketones, carboxylic acids, esters and aldehydes as disclosed in British patent specification Nos. 772,600, 776,157, 785,789 and 797,425, U.S. Pat. No. 2,830,030 and German Pat. Nos. 1,020,457 and 1,092,652.

Specific examples of swelling agents useful in this invention are benzoic acid, salicylic acid, salicylic acid esters, monochloroacetic acid, dichloroacetic acid, trichloroacetic acid, trifluoroacetic acid, methanesulfonic acid, trifluoromethanesulfonic acid, nitropropanol, benzyl alcohol, benzaldehyde, acetylacetone, acetylphenol, benzamide, benzonitrile, anisole, nitrobenzyl alcohol, chlorobenzyl alcohol, pyrrole, chloral hydrate, benzylamine, xylylenediamine, nicotinamide and nicotinic acid esters. In addition, there can be used commonly used swelling agents such as those having a phenol group, such as phenol, o-chlorophenol, p-chlorophenol, dichlorophenol, phenylphenol, chlororesorcinal, fluoroglycin, orcinol, o-cresol, m-cresol, p-cresol, resorcinols and methoxyphenol.

Of these compounds, resorcinol, chlororesorcinol, 4-methylresorcinol, 2-methylresorcinol, catechol, pyrogallol, fluoroglycin, pyrrol, chloral hydrate, orcinol, monochloroacetic acid, trichloroacetic acid and trifluoroacetic acid are preferred in view of their solubility in water. Particularly, resorcinol is preferably used in view of the extent of its solubility in water, ease of handling, low adverse photographic affects and marked preferred effects or advantages.

When used, the quantity of polyester swelling agent added to an undercoating composition is in the range of about 0.5 to 15% by weight, preferably 2 to 8% by weight, based on the total weight of the undercoating composition. If less than about 2% by weight is used, there is little swelling effect, while if more than about 8% by weight is used, the surface is deteriorated and the drying load is increased.

When the undercoating composition of the present invention is used better adhesiveness with a small coating amount of a swelling agent is provided as compared with the case of using the undercoating compositions of the prior art which obtain adhesion by an anchoring effect between the undercoating layer and the polyester, that is, by coating a large amount of the swelling agent for polyesters. For example, the coating quantity is reduced to half of that of the prior art. It is assumed from this result that the adhesive effect between an undercoating layer and a polyester according to the present invention is completely different from that of the prior art.

Since in the case of using the undercoating composition of the present invention drying can be completed in a short time, the polyester support is not subjected to unfavorable changes such as expansion, shrinkage and lowering of elasticity during drying, and, thus, a film having excellent surface properties which is free from wrinkles can be obtained.

Further, to the undercoating composition of the invention there can be added, if necessary or desired, additives which are, in general, used in coating composition, for example, monocarboxylic acids used for dispersing gelatin, such as salicylic acid and formic acid, hardeners, antistatic agents, matting agents and coloring agents.

Examples of hardeners which can be used in the undercoating composition of the invention are aldehyde type hardeners such as mucochloric acid, formaldehyde, and 2,3-dihydroxy-5-methyl-1,6-dioxane, aziridine type hardeners such as 1,6-hexamethylene-N,N'-bisethyleneurea, N-methylol type hardeners such as N-methylolmelamine, active olefin type hardeners such as hexahydro-1,3,5-triacryl-S-triazine and active halogen type hardeners such as 2,4-dichloro-6-hydroxy-1,3,5-triazine. Examples of additional suitable hardeners are described in U.S. Pat. Nos. 2,080,019; 2,725,294 and 2,725,295 and in Japanese Patent Publication No. 6,151/72.

As antistatic agents, there can be used alkylsulfonates, alkylamines and quaternary ammonium salts. As matting agents, there can be used silica, alumina, titanium oxide, barium sulfate, starch, dextrin and polymer latexes. In addition, halogen-containing synthetic resins, polyolefins, acrylic resins or rubbers can be used in combination. Other additives which are commonly used for undercoating compositions can also be added as the need arises.

The undercoating layer according to the present invention may be either in the form of a single layer or two layers. In the case of a single layer, the undercoating composition of the invention containing the epoxy compound, optionally, an organic colloid such as gelatin, a swelling agent for polyesters and other additives as disclosed above is coated onto a polyester support which can optionally be subjected to a surface treatment, dried and then a photographic emulsion layer coated thereon. In the case of two layers, the undercoating composition of the invention containing the epoxy compound and optionally other additives, preferably having the same composition as in a single layer, is coated onto a polyester support optionally subjected to a surface treatment (referred to as "first undercoating layer"), dried and then a composition containing a hydrophilic organic colloid such as gelatin is coated thereover (the hydrophilic colloid is coated in an amount of about 0.01 to about 0.5 $g/m^2$, preferably 0.05 $g/m^2$ to 0.2 $g/m^2$) and optionally a swelling agent for polyesters and other additives (preferably containing a surfactant in an amount of about 0.01 to about 0.2% by weight and a swelling agent for polyesters in an amount of about 0.5 to about 15% by weight, preferably 2 to 8% by weight, based on the amount of hydrophilic organic colloid used in the second undercoating layer) can be coated thereon (referred to an "second undercoating layer"). A photographic emulsion layer can then be coated thereon. Further, the first undercoating composition and the second undercoating composition may simultaneously be coated and dried, if desired. A swelling agent for polyesters can be incorporated in the second undercoating layer and/or first undercoating layer. In the case of a single layer of undercoating composition, the quantity of gelatin optionally used is about 20 times that of the epoxy compound (by weight) or less, preferably 10 times or less. In the case of coating the undercoating layer in two layers, the degree of freedom as to combinations of undercoating compositions is increased, resulting in a stable and excellent undercoating composition.

The undercoating composition of the present invention can be applied by various conventional coating methods, for example, dip coating, air knife coating, curtain coating or extrusion coating using a hopper as described in U.S. Pat. No. 2,681,294. If necessary or desired, two or more layers can be simultaneously coated by the methods described in U.S. Pat. Nos. 2,761,791; 3,508,947; 2,941,898 and 3,526,528 and in Harazaki et al., *Coating Kogaku* (*Coating Engineering*), page 253, published by Asakura Shoten, Tokyo (1973).

After the undercoating composition is coated onto a support of polyethylene terephthalate, drying is ordinarily carried out at about 100° to about 150° C for at least about 1 minute and preferably for up to about 5 minutes, more preferably, at 100° to 130° C, in order to obtain good surface properties as well as adequate adhesiveness. The undercoating composition of the invention can, as the need arises, be coated on both surfaces of the support by the above described coating methods.

A photographic emulsion layer is then coated onto the polyester support to which the undercoating layer(s) has been applied. As such a photographic emulsion layer, there are given, for example, a gelatin layer, a mixed layer of a synthetic polymer and gelatin, a synthetic polymer layer, an antihalation layer containing black colloidal silver or antihalation dye in a hydrophilic organic colloid such as gelatin, a light-sensitive silver halide emulsion layer, an image receiving layer containing an oxidizable metal salt dispersed in a hydrophilic organic colloid, a mordanting layer, a layer containing a dye developer, a back layer, etc.

The photographic emulsion layer used in the invention will now be illustrated. As a binder for such a photographic emulsion, hydrophilic organic colloids such as gelatin and as described in the foregoing undercoating composition can all be used. As the light sensitive silver halide, there can be used various silver halides such as silver chloride, silver bromide, silver chlorobromide, silver iodide and silver chloroiodobromide, the crystal habit of which is of no consequence.

Sensitizers can be added to photographic silver halide emulsions, if desired. Examples of useful sensitizers used in this invention are sulfur compounds as described in U.S. Pat. Nos. 1,574,944 and 2,278,947, reducing materials such as stannous salts and amines as described in U.S. Pat. Nos. 2,487,850 and 2,518,698, gold compounds and gold hypo complex salts as described in U.S. Pat. Nos. 2,597,856 and 2,399,083, quaternary ammonium salts as described in U.S. Pat. Nos. 2,271,623 and 2,334,864 and polyethylene glycols.

Examples of antifoggants which can be added to photographic silver halide emulsion layers used in this invention are benzothiazolium salts as described in U.S. Pat. No. 2,131,038, nitroazoles as described in British patent specification No. 403,789, mercapto compounds such as mercaptotetrazole, mercaptopyridine, mercaptotetrazaindene and mercaptobenzothiazole and nitrogen-containing heterocyclic compounds, as are well known in the art.

Surfactants as can be added to any coating composition include saponins, alkylarylsulfonates, and polyethylene glycol ethers as are conventional in the art. Further, if desired, hardeners can be added to any coating composition, e.g., aldehydes, halogen-substituted acids as described in U.S. Pat. No. 2,080,019, acid anhydrides as described in U.S. Pat. No. 2,725,294, acid halides as described in U.S. Pat. No. 2,725,295, chlorotriazines and sodium bisulfite adducts. Polymer latexes can also be added, e.g., copolymers as described in U.S. Pat. Nos. 3,411,911; 3,411,912; 3,287,289 and 3,488,708.

Further, spectral sensitizing dyes can be added to the photographic silver halide emulsion, if desired, e.g., there can be used cyanine dyes and merocyanine dyes.

Color forming couplers can also be present as are conventional in the art, for example, two equivalent or four equivalent couplers, colored couplers and DIR couplers. Furthermore, other additives ordinarily used in the art can be present.

The undercoating layer according to the present invention can be used for various photographic materials, for example, black-and-white negative films, black-and-white reversal films, black-and-white positive films, black-and-white printing papers, printing films such as lithographic films, X-ray films, black-and-white direct positive films, color negative films, color positive films, color papers, color direct positive photographic materials, light sensitive materials for black-and-white diffusion transfer methods, light sensitive materials for color diffusion transfer methods, non-silver salt light sensitive materials such as diazo films and light sensitive materials using water soluble light sensitive polymers, etc.

Furthermore, the undercoating composition of the invention can be adapted to polyester film bases and articles using the same other than photographic materials.

In articles carrying a hydrophilic organic colloid, in particular, a photographic emulsion obtained by coating on an undercoating layer of the invention, the undercoated layer is very strongly bonded to the photographic emulsion layer comprising a hydrophilic organic colloid whether one or both are dry or wet, and, thus, there is no deterioration during the passage of time even in the state of a raw film or after development.

In the undercoating composition of the present invention, water is used as the primary solvent, and, in particular, the use of an organic solvent is not always necessary, so that production costs are low and there is no danger of explosion or hazards to humans.

In the undercoating method using the undercoating composition of the invention, only a small amount of a swelling agent for polyesters can be used for high speed coating. In the undercoating method using the undercoating composition of the invention, drying can be effected in a short time at a relatively low temperature, and, consequently, the surface properties of a polyester support are not deteriorated and a markedly strong adhesiveness between the polyester surface and a photographic emulsion layer is obtained without lowering photographic properties.

The following examples are given in order to illustrate the invention in more detail without limiting the same. The adhesiveness of a photographic emulsion layer to a film support was measured and assessed by the following conventional testing methods:

1. Adhesiveness test method for dry film

Onto an emulsion surface to be tested seven notches were made at 5 mm interval both in the vertical and lateral directions to form 36 squares, on which an adhesive tape, for example, Nitto Tape manufactured by Nitto Denki Kogyo Co., Ltd. was applied. The adhesive tape was then quickly stripped at an angle of 180°. In this method, the adhesive strength was denoted Grade A where the unstripped area was in 90% or more, Grade B for 60% to $< 90\%$ and Grade C for less than 60%. An adhesive strength sufficient for practical use in a photographic material is Grade B or better, preferably Grade A.

2. Adhesiveness test method for wet film

In each stage of development, fixing and water washing, the emulsion surface of the film was scratched with an iron pen to form an *x* mark thereon and then strongly rubbed with a finger tip five times. The adhesive strength was assessed by the maximum stripped width along the *x* mark, i.e., the adhesive strength was denoted Grade *a* where the emulsion layer was not stripped more than the *x* mark, Grade *b* where the maximum stripped width was less than 5 mm and Grade *c* in other cases. An adhesive strength sufficient for practical use in a photographic material is Grade *b* or better, preferably Grade *a*.

EXAMPLE 1

Onto a polyethylene terephthalate film having a thickness of 100 microns there was coated in an amount of 10 ml/$m^2$ the undercoating composition having the following composition:

| | | |
|---|---|---|
| N,N',N"-tris(2,3-epoxypropyl)-isocyanurate (Compound 1) | 0.20 | g |
| Saponin | 0.03 | g |
| Distilled water | 100 | g |

The coated film was then dried at 120° C for 2 minutes, coated with an aqueous gelatin solution containing a polyester swelling agent (gelatin 0.3 g, resorcinal 3 g, salicylic acid 0.01 g, saponin 0.075 g, water 100 g) in an amount of 30 ml/$m^2$ and dried at 120° to 130° C for 2 minutes. The surface was further coated with a conventional silver iodobromide-gelatin emulsion (silver iodide 2.5 mol%) to give a proportion of 3 g of silver and 3.5 g of gelatin per 1 $m^2$ and dried at 30° C for 30 minutes to prepare a silver halide photographic material. The adhesiveness between the emulsion layer and the support of the resulting photographic light sensitive material was excellent in both the dry and wet states as shown in Table 1, as compared with a sample (control) obtained by coating, without providing the undercoating layer of the invention, the above described aqueous gelatin solution, drying and then coating the same gelatin-silver halide emulsion.

TABLE 1

| | Adhesion in the Dry State | Adhesion in the Wet State |
|---|---|---|
| Photographic film having an undercoating layer containing N,N',N"-tris(2,3-epoxypropyl)-isocyanurate | A | a |
| Control | C | c |

The photographic film of the present invention thus obtained had good photographic properties which were similar to those of the control sample.

EXAMPLE 2

Onto a polyethylene terephthalate film of a thickness of 180 microns there was coated in an amount of 15 ml/$m^2$ an undercoating composition of this invention having the following composition:

| | | |
|---|---|---|
| N,N',N"-tris(2,3-epoxypropyl)-isocyanurate (Compound 1) | 0.15 | g |
| Saponin | 0.03 | g |
| Resorcinal | 2.0 | g |
| Distilled water | 100 | g |

and dried at 120° C for 2 minutes to thus form a first undercoated layer. Then the undercoating composition for the second undercoated layer having the following composition:

| | | |
|---|---|---|
| Gelatin | 0.1 | g |
| Saponin | 0.05 | g |
| Salicylic acid | 0.01 | g |
| Resorcinol | 3.0 | g |
| -continued | | |
| Distilled water | 100 | g |

was coated onto the first layer in an amount of 15 ml/$m^2$ and dried at 120° to 130° C for 2 minutes. When the surface was coated with a gelatin-silver halide emulsion as was used in Example 1 and dried as in Example 1, the adhesiveness between the emulsion layer and support was assessed to be Grade A and Grade *a* in the dry and wet states, respectively.

EXAMPLE 3

Onto a polyethylene terephthalate film having a thickness of 100 microns which had been subjected to a corona discharge treatment (discharge output 600 W) there were sequentially applied in an amount of 20 ml/$m^2$ the two undercoating compositions having the following compositions:

| | (1) | | (2) | |
|---|---|---|---|---|
| N,N',N"-tris(2,3-epoxypropyl)-isocyanurate (Compound 1) | 0.05 | g | 0.01 | g |
| Gelatin | 0.3 | g | 0.3 | g |
| Saponin | 0.075 | g | 0.075 | g |
| Resorcinol | 4.0 | g | 4.0 | g |
| Formic acid | 0.1 | g | 0.1 | g |
| Distilled water | 100 | g | 100 | g |

The coated film was then dried at 120° to 130° C for 3 minutes, further coated with the gelatin-silver halide emulsion of Example 1 as in Example 1 and dried. In the case of (1), the adhesiveness between the emulsion layer and support was Grade A in the dry state and Grade *a* in the wet state, and in the case of (2), the adhesiveness was Grade B to C in the dry state and Grade *a* in the wet state.

EXAMPLE 4

Onto a polyethylene terephthalate film having a thickness of 84 microns there was applied in an amount of 10 ml/$m^2$ the undercoating composition of this invention having the following composition:

| | | |
|---|---|---|
| 2,4,6-triglycidyloxy-1,3,5-triazine (Compound 14) | 0.05 | g |
| Gelatin | 0.3 | g |
| Saponin | 0.05 | g |
| Resorcinol | 6.0 | g |
| Salicylic acid | 0.02 | g |
| Distilled water | 100 | g |

The coated film was then dried at 140° C for 1 minute, further coated with the gelatin-silver halide emulsion of Example 1 and dried as in Example 1. The resulting photographic material showed excellent photographic properties as well as good adhesiveness (Grade A in the dry state and Grade *a* in the wet state).

EXAMPLE 5

Onto a polyethylene terephthalate film having a thickness of 175 microns which had been subjected to ultraviolet radiation using a mercury lamp (3 kw, length 45 cm and an effective arc length of about 30 cm) there was applied in an amount of 20 ml/$m^2$ the undercoating composition having the following composition:

| | | |
|---|---|---|
| Tetraethylene glycol diglycidyl ether (Compound 10) | 0.1 | g |

-continued

| | | |
|---|---|---|
| Water | 50 | ml |
| Acetone | 30 | ml |
| Methanol | 20 | ml |

The coated film was then dried at 120° C for 2 minutes, coated with a gelatin dispersion consisting of 1 g of gelatin, 2 g of water, 0.2 g of acetic acid, 50 g of methanol, 20 g of methylene chloride and 20 g of acetone in an amount of 30 ml/$m^2$ and dried at 120° C for 2 minutes. The resulting surface was further coated with the gelatin-silver halide emulsion of Example 1 and dried as in Example 1. The adhesiveness between the emulsion layer and the support of the photographic material was Grade A to B in the dry state and Grade *a* in the wet state; photographic properties were also excellent.

While the invention has been described in detail and with reference to specific embodiments thereof, it will be apparent to one skilled in the art that various changes and modifications can be made therein without departing from the spirit and scope thereof.

What is claimed is:

1. An undercoating composition for photographic polyester film wherein the polyester is a condensation product of a dibasic aromatic acid and a glycol which contains (1) a compound having two or more epoxy groups in its molecule and a molecular weight of about 1,000 or less, said compound being represented by general formula (I):

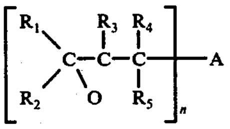

(I)

wherein $R_1$ to $R_5$, which may be the same or different, represent a hydrogen atom or an alkyl group having 1 to 3 carbon atoms, *n* represents an integer of 2 to 6 and A represents a linear or cyclic group having *n* nitrogen atoms or *n* oxygen atoms where the nitrogen atoms or oxygen atoms are directly bonded to the glycidyl group, a 5- or 6-membered heterocyclic ring having two or more active nitrogen atoms in the ring, a nitrogen atom, a phosphate group or a sulfate group; and (2) water as a primary solvent or sole solvent.

2. The undercoating composition as claimed in claim 1, which further comprises a surfactant in an amount of about 0.01 to about 0.2% by weight based on a total amount of the undercoating composition.

3. The undercoating composition as claimed in claim 1, which further contains a hydrophilic organic colloid in an amount of about 0.01 to about 2.5% by weight based on a total amount of the undercoating composition.

4. The undercoating composition as claimed in claim 1, which further comprises a swelling agent for polyesters in an amount of about 0.5 to about 15% by weight based on a total amount of the undercoating composition.

5. The undercoating composition of claim 1 wherein A represents a linear or cyclic group having *n* nitrogen atoms.

6. The undercoating composition of claim 1 wherein said compound represented by general formula (I) is obtained from olefins through ozone oxydation or peroxydation or obtained by the reaction of alcohols and epihalohydrins or methylepihalohydrins.

* * * * *